June 28, 1955  C. P. ALLEN  2,711,905
COLLAPSIBLE SHOPPING CARTS
Filed Feb. 25, 1953  3 Sheets-Sheet 1

INVENTOR.
CECIL P. ALLEN
BY
ATTORNEY

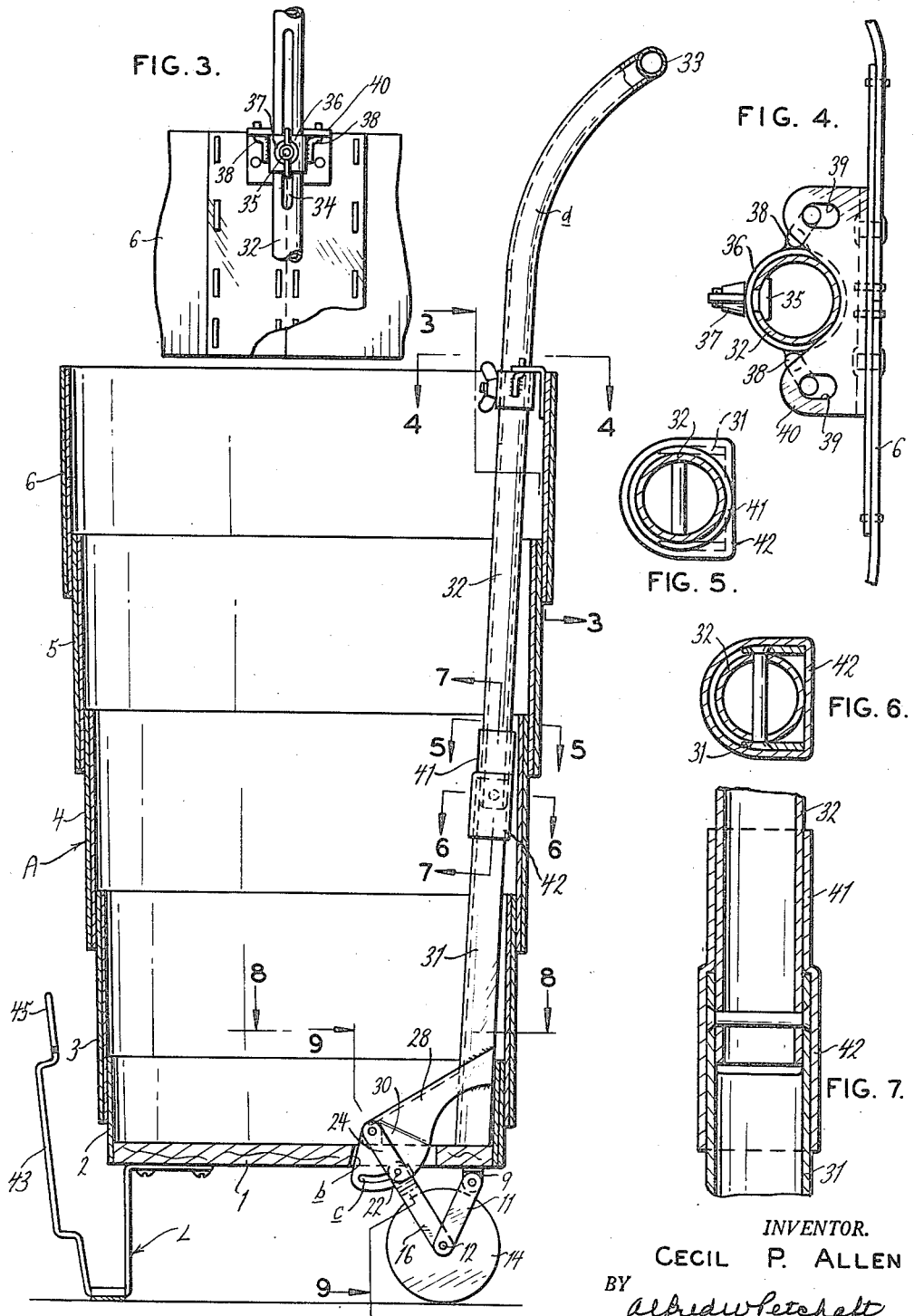

June 28, 1955 C. P. ALLEN 2,711,905
COLLAPSIBLE SHOPPING CARTS
Filed Feb. 25, 1953 3 Sheets-Sheet 3
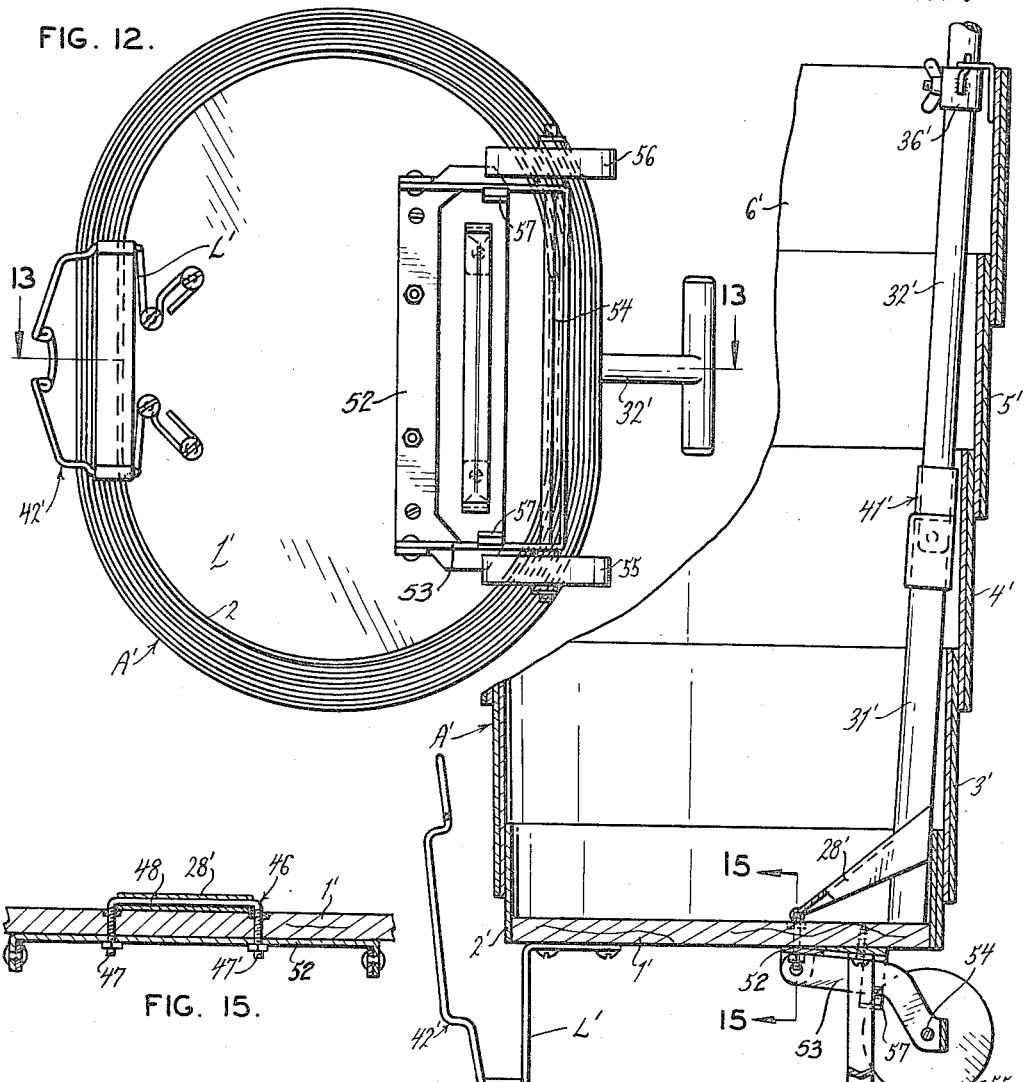
FIG. 12.
FIG. 13.
FIG. 15.
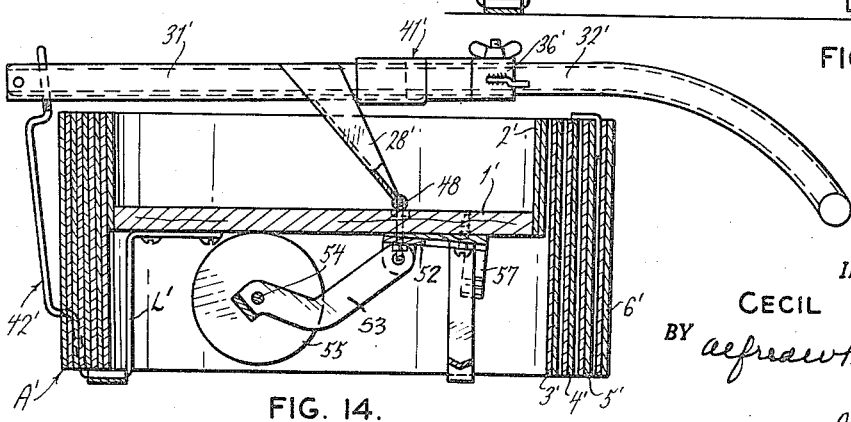
FIG. 14.
INVENTOR.
CECIL P. ALLEN
BY *Alfred W Petchaft*
ATTORNEY

United States Patent Office 2,711,905
Patented June 28, 1955

2,711,905
COLLAPSIBLE SHOPPING CARTS

Cecil P. Allen, St. Louis, Mo.

Application February 25, 1953, Serial No. 338,698

6 Claims. (Cl. 280—41)

This invention relates to certain new and useful improvements in collapsible shopping carts.

At the present time, with the rapid growth of large supermarkets and shopping centers and the widespread trend toward increased storage facilities in the home, it has become the general practice of housewives to shop less frequently and to purchase larger quantities of household requirements at each shopping trip. In fact, the average American housewife no longer makes a daily trip to the corner grocery store to purchase a small quantity of food and other household materials. The large shopping centers, however, are not as conveniently accessible to all portions of the areas which they serve and it is frequently necessary for the shopper to drive to the shopping center in her automobile or travel in to public transportation. Even when driving in her own automobile, the housewife frequently has to park at a distance from the market or store in which she intends to do her shopping. Consequently, it has become increasingly difficult to carry several large cumbersome sacks of groceries and other household products from the store to her parked automobile or to her home in case it is necessary to use the streetcar or bus.

It is, therefore, the primary object of the present invention to provide a portable parcel carrier which can be folded up quickly and conveniently into extremely compact size so that it may be readily carried in the hand or under the arm when not in use and which can be very quickly and simply unfolded to provide a spacious, rugged-wheeled carrier into which parcels of various size, shape and weight can be placed for transportation from the store to the home.

It is another object of the present invention to provide a portable carrier of the type stated which can be unfolded and set up with a few simple movements and will automatically form a self-bracing receptacle which, when in opened or receptacle-forming position, is extremely rigid and strong.

It is also an object of the present invention to provide a portable carrier of the type stated which is simple and economical in construction and can be manufactured at relatively low cost.

With the above and other objects in view, my invention resides in the novel features of form, construction, arrangement, and combination of parts presently described and pointed out in the claims.

In the accompanying drawings (three sheets)—

Figure 2 is a vertical sectional view of the shopping cart;

Figure 1:
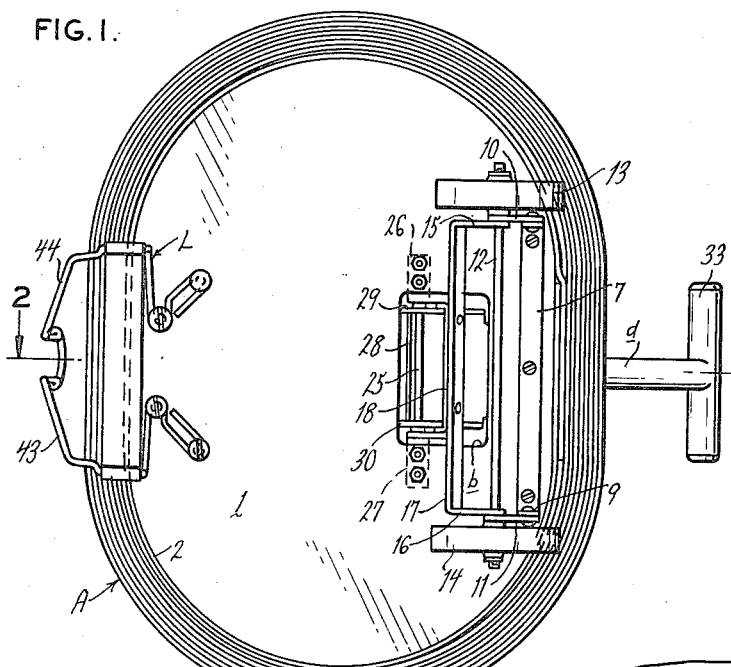
Figure 1 is a bottom plan view of a collapsible shopping cart constructed in accordance with and embodying the present invention.
Figure 8:
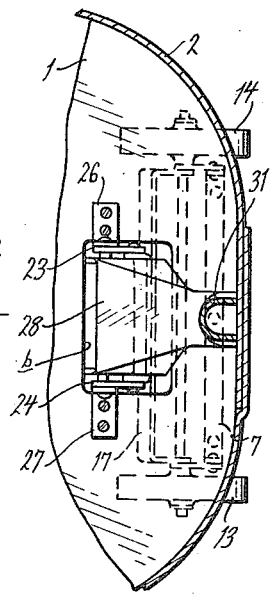
Figure 11:
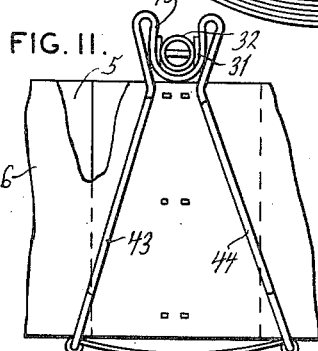
Figure 9:
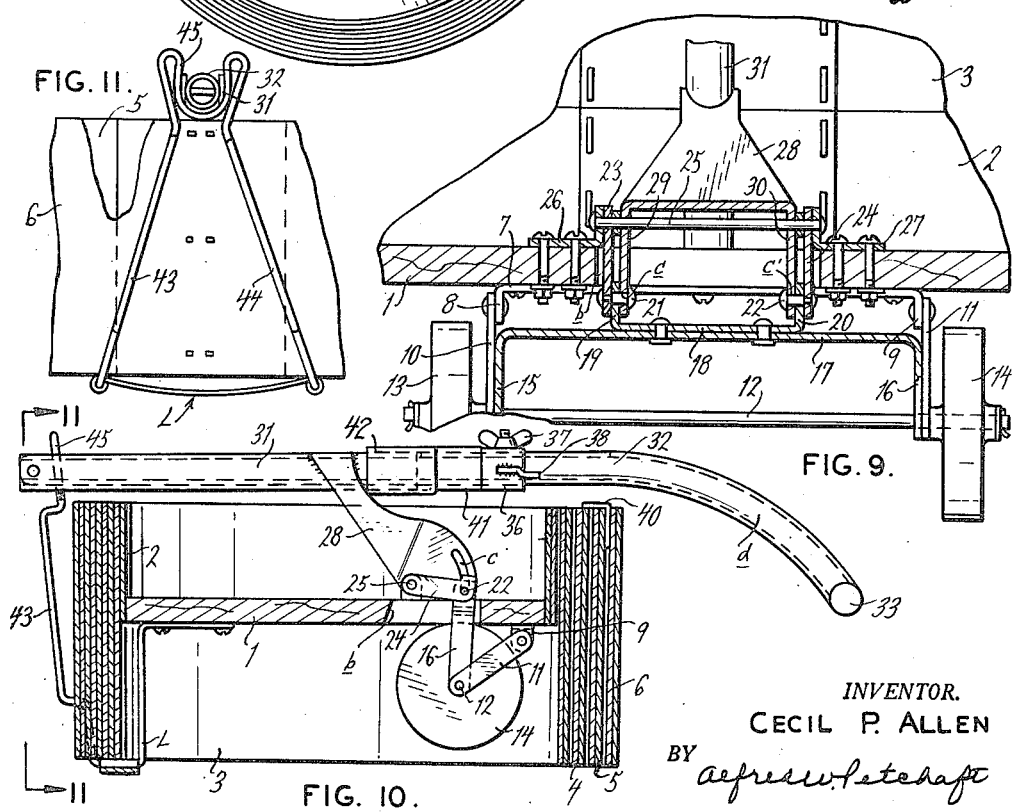
Figure 10:
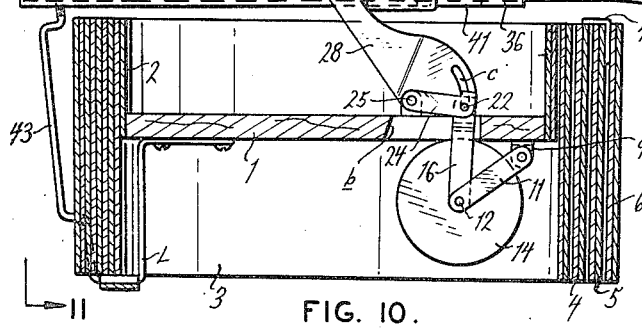

Figures 3, 4, 5, 6, 7, 8, and 9 are fragmentary sectional views taken along lines 3—3, 4—4, 5—5, 6—6, 7—7, 8—8, and 9—9, respectively, of Figure 2;

Figure 10 is a vertical sectional view of the shopping cart in collapsed position;

Figure 11 is a fragmentary sectional view taken along line 11—11 of Figure 10;

Figure 12 is a bottom plan view of a modified form of collapsible shopping cart constructed in accordance with and embodying the present invention;

Figure 13 is a vertical sectional view taken along line 13—13 of Figure 12;

Figure 14 is a vertical sectional view of the modified form of shopping cart in collapsed position; and Figure 15 is a fragmentary sectional view taken along line 15—15 of Figure 13.

Referring now in more detail and by reference characters to the drawings, which illustrate practical embodiments of the present invention, A designates a collapsible shopping cart comprising a bottom member 1 formed preferably of a relatively thick piece of wood or similar material and being of somewhat oval peripheral contour. Tacked or otherwise secured to and extending continuously around the peripheral margin of the bottom member 1 is an upstanding wall member 2 which is flared outwardly and upwardly so that its upper margin is of somewhat larger peripheral size than its lower margin, but is geometrically similar in shape thereto. Shiftably mounted upon the wall member 2 are successively telescoping wall sections 3, 4, 5, 6, all being formed of fiber-board or any other self-supporting relatively durable and strong material and adapted, when extended, to assume the relation shown in Figure 2 or, when collapsed, to telescope or nest one within the other as shown in Figure 10.

Screwed or otherwise rigidly mounted upon the under face of the bottom member 1 adjacent the rearward margin thereof is a U-shaped hinge-bracket 7 having depending ears 8, 9, for rockably supporting links 10, 11, respectively, which, in turn, support an axle 12 rotatably provided at its outer end with wheels 13, 14. Also rockably mounted upon the axle 12 are depending leg portions 15, 16, of a U-shaped rocking-bracket 17 which is provided centrally of its bight with an upwardly presented U-shaped element 18 having upstanding ears 19, 20, which are rockably connected by means of hinge-forming rivets 21, 22, respectively, to links 23, 24, which are, in turn, pivoted at their upper ends upon an elongated pintle 25 supported at its ends in bracket members 26, 27, rigidly mounted on the upper face of the bottom member 1. Also pivoted upon the pintle 25 and extending downwardly through the opening b in the bottom member 1 is a handle bracket 28 having a pair of spaced parallel flanges 29, 30, provided with matching arcuate slots c, c', which respectively engage the pins 21, 22. The bracket 28 extends angularly upwardly above the bottom member 1 and is rigidly secured to the lower end of a tubular handle section 31, the lower end of which is adapted to fit flatwise and flush against the upper face of the bottom member 1 when the handle section 31 is in upright position, as shown in Figure 2. The handle section 31 is pivotally connected to an upper handle section 32 which, when the collapsible cart A is in upright position, extends upwardly beyond the rim thereof and is curved as at d, terminating in a transverse T-shaped grip 33. The upper handle section 32 is provided with a longitudinally extending slot 34 for slidably accommodating a stud bolt 35, the shank of which extends radially outwardly therethrough and is seated in an annular sleeve 36 afforded by the slot 34.

At its outer or projecting end, the stud 35 is provided with a wing nut 37 by which the sleeve 36 may be locked in any selected position of adjustment between the limits of its travel. The sleeve 36 is, furthermore, provided with diametrally opposite, outwardly extending, upwardly turned prongs 38 which are adapted for engagement within registering apertures 39 formed in an L-shaped bracket 40 which is, in turn, riveted to the uppermost side wall member 6 adjacent the upper peripheral margin thereof. Thus, when the collapsible cart is in upright or operative position, the handle will be locked in the bracket 40, substantially as shown in Figures 2 and 4, so that the side wall members 3, 4, 5, 6, are all held securely in upright position and are locked to the upper handle section 32.

Shiftably mounted in snug-fitting relation upon the lower end of the handle section 32 is a tubular sleeve 41, the lower portion 42 of which is of flat sided cross-sectional shape as shown in Figure 6 for retentive engagement with the lower handle section 31. When it is desired to collapse the handle sections 31, 32, the sleeve 41 is shifted upwardly along the upper handle section 32, so that the lower portion 42 thereof becomes disengaged from the upper end of the lower handle section 31. Thereupon, the handle sections 31, 32, may be pivoted with respect to each other and the lower portion of the upper handle section 32 will be nested within the U-shaped channel of the lower handle section 31 and, thereupon, the sleeve 41 may again be shifted along the handle section 32 for re-engagement with the adjacent portion of the handle section 31, substantially as shown in Figure 10. Finally, the sleeve 36 may be slid downwardly and the wing nut 37 tightened to hold the handles tightly and securely in this collapsed position.

As will be seen by reference to Figures 2 and 10, the downward swinging or collapsing movement of the handle section 31 will cause the bracket 28 to swing upwardly and retract the wheels 13, 14, shifting them from the operative position shown in Figure 2 to the inoperative or nested position shown in Figure 10.

Finally, the bottom member 1 is provided, adjacent its forward margin, with a wire supporting leg L having upwardly converging elements 43, 44, integrally connected at their upper ends with a transversely extending inverted U-shaped clip element 45 for retentively engaging the outwardly projecting end of the handle section 31 when the latter is in collapsed position, as shown in Figures 10 and 11.

The collapsible cart A, when in the fully collapsed position shown in Figure 10, may be carried about in any convenient manner and will provide a relatively light weight compact unit. Upon reaching the store or supermarket, the user can readily disengage the lower handle section 31 from the clip or securement element 45 and, by loosening the wing nut 37, slide the sleeve 36 outwardly to release the sleeve 41 which may, thereupon, also be slid outwardly to release the handle sections 31, 32, so that the latter may be swung upwardly into the position shown in Figure 2. This upward swinging movement automatically will swing the wheels 13, 14, downwardly into operative or ground-engaging position. Thereupon, the side wall sections 3, 4, 5, 6, may be slid upwardly to the extended position shown in Figure 2 and the bracket 40 of the uppermost wall member 6 can be engaged in the prongs 38 of the sleeve 36, substantially in the manner shown in Figures 2 and 4, thereby holding all of the wall sections securely in such upright or operative position. The leg member L will, of course, serve as a forward leg upon which the cart A may rest when it is not being rolled from place to place. As the user desires to roll the cart from place to place, the handle section 32 may be swung backwardly to tilt the cart slightly and lift the leg member L upwardly from the floor, so that the cart A will be supported solely upon the wheels 13, 14, and may be wheeled from place to place as desired.

If desired, it is possible to provide a modified form of collapsible cart A', as shown in Figures 12 to 15, inclusive, which comprises a bottom member 1' and wall members or sections 2', 3', 4', 5', 6', all being substantially similar to the previously described elements 1, 2, 3, 4, 5, 6, of the collapsible cart A. The bottom member 1', however, is not provided with an opening and instead is provided with a downwardly turned U-shaped wire member 46 having threaded legs 47, 47', and a pintle-forming bight 48 upon which is mounted a handle-supporting bracket 28', rigidly secured to a handle section 31' which is pivotally connected to an upper handle section 32'. The handle sections 31', 32', being substantially identical in all respects to the previously described handle sections 31, 32, and including corresponding sleeves 36' and 41', which, in turn, are substantially identical in all respects to the previously described sleeves 36, 41. Rigidly mounted upon the bottom member 1' is a leg-forming member L' which is substantially identical with the previously described leg-forming member L. Also rigidly mounted upon the under face of the bottom member 1' is a hinge-forming bracket 52 for swingably supporting a U-shaped frame 53 which is, in turn, provided with an axle 54 having wheels 55, 56. The frame 53 with its associated axle 54 and wheels 55, 56, may be manually swung from the position shown in Figure 13 to the position shown in Figure 14. The frame 53 is optionally held in the position shown in Figure 13 by engagement with the spring clip 57.

When in collapsed position, as shown in Figure 14, the portable cart A' may be carried conveniently from place to place in any suitable manner and when the user desires to set it up for actual use as a cart, the handle sections 31', 32', may be swung into upright position and the side walls 3', 4', 5', 6', may be erected in substantially the same manner as described in connection with the collapsible cart A. The wheels 54, 55, may be manually swung downwardly into operative position and the cart A' is then ready for actual use.

It should be understood that changes and modifications in the form, construction, arrangement, and combination of the several parts of the collapsible shopping cart may be made and substituted for those herein shown and described without departing from the nature and principle of my invention.

Having thus described my invention, what I claim and desire to secure by Letters Patent is:

1. A collapsible shopping cart comprising a bottom member, a plurality of wall members telescopically nested one within the other, the innermost of said wall members being attached to the bottom member in such manner that when the wall members are in nested position the bottom member will be located intermediate the respective planes of the top and bottom margins of the nested members in the provision of a downwardly presented recess, said wall members furthermore being so arranged that when they are shifted outwardly away from the bottom member they will become engaged with each other in an extended position to form a hollow open-top receptacle, a handle collapsibly mounted on the bottom wall for folded position in compact relation parallel to the bottom member and across the top margins of the wall members when the latter are in nested position, said handle being adapted to extend upwardly from the bottom member into rigid upright position along the inside face of the wall members when the latter are in extended position, means for effecting releasable engagement between the handle and the wall members when in said upright and extended position, and ground-engaging wheels operatively mounted on the bottom member and positioned for substantially enclosed disposition within the downwardly presented recess when the wall members are nested.

2. A collapsible shopping cart comprising a bottom member, a plurality of wall members telescopically nested one within the other, the innermost of said wall members being attached to the bottom member in such manner that when the wall members are in nested position the bottom member will be located intermediate the respective planes at the top and bottom margins of the nested members in the provision of a downwardly presented recess, said wall members furthermore being so arranged that when they are shifted outwardly away from the bottom member they will become engaged with each other in an extended position to form a hollow open-top receptacle, a handle collapsibly mounted on the bottom wall for folded position in compact relation to the bottom member and the wall members when the latter are in nested position and being adapted to extend upwardly from the bottom member into rigid upright position along the inside face of the wall members when the latter are in extended position, means for effecting releasable engagement between the handle and the wall members when in said upright and extended position, and ground-engaging means operatively mounted upon the bottom member and positioned substantially within said downwardly presented recess when the wall members are nested.

3. A collapsible shopping cart comprising a bottom member, a plurality of wall members telescopically nested one within the other, the innermost of said wall members being attached to the bottom member in such manner that when the wall members are in nested position the bottom member will be located intermediate the respective planes of the top and bottom margins of the nested members in the provision of a downwardly presented recess, said wall members furthermore being so arranged that when they are shifted outwardly away from the bottom member they will become engaged with each other in an extended position to form a hollow open-top receptacle, a handle collapsibly mounted on the bottom wall for folded position in compact relation to the bottom member and the wall members when the latter are in nested position and being adapted to extend upwardly from the bottom member into rigid upright position along the inside face of the wall members when the latter are in extended position, means slidably mounted on the handle for effecting releasable engagement between the handle and the wall members when in said upright and extended position, and ground-engaging means swingably mounted on the under side of the bottom member and adapted to swing up toward the bottom member into substantially enclosed position within the downwardly opening recess when the wall members are nested and being adapted to swing outwardly into ground-engaging position with respect to the wall members when the latter are in extended position.

4. A collapsible shopping cart comprising a bottom member, a plurality of wall members telescopically nested one within the other, the innermost of said wall members being attached to the bottom member in such manner that when the wall members are shifted outwardly away from the bottom member they will become engaged with each other in an extended position to form a hollow open-top receptacle, a handle hingedly mounted at one end on the upper face of the bottom wall for folded position in parallel relation to the bottom member and across the top margins of the wall members when the latter are in nested position, said handle being adapted to extend upwardly from the bottom member into rigid upright position along the inside face of the wall members when the latter are in extended position, a sleeve slidably mounted on the handle having hook-like means for effecting releasable engagement between the handle and the wall members when in said upright and extended position, means for optionally locking the sleeve in wall-member engaging position, and ground-engaging wheel means swingably mounted upon the under face of the bottom member for optional disposition in compact folded position against the bottom member when the wall members are in nested relation and in outwardly swung ground-engaging position when the wall members are in extended position.

5. A collapsible shopping cart comprising a bottom member, a plurality of wall members telescopically nested one within the other, the innermost of said wall members being attached to the bottom member in such manner that when the wall members are shifted outwardly away from the bottom member they will become engaged with each other in an extended position to form a hollow open-top receptacle, a handle collapsibly mounted on the bottom wall for folded position in compact relation to the bottom member and the wall members when the latter are in nested position and being adapted to extend upwardly from the bottom member into rigid upright position along the inside face of the wall members when the latter are in extended position, means for effecting releasable engagement between the handle and the wall members when in said upright and extended position, ground-engaging wheel means swingably mounted upon the bottom member for optional disposition in compact folded position against the bottom member when the wall members are in nested relation and in outwardly swung ground-engaging position when the wall members are in extended position, and means operatively connecting the handle and the wheel means for causing the handle and wheel means to swing simultaneously into and out of collapsed positions.

6. A collapsible shopping cart comprising a bottom member, a plurality of wall members telescopically nested one within the other, the innermost of said wall members being attached to the bottom wall in such manner that when the wall members are shifted outwardly away from the bottom member they will become engaged with each other in an extended position to form a hollow open-top receptacle, a handle collapsibly mounted on the bottom wall for folded position in compact relation to the bottom member and the wall members when the latter are in nested position and being adapted to extend upwardly from the bottom member into rigid upright position along the inside face of the wall members when the latter are in extended position, means for effecting releasable engagement between the handle and the wall members when in said upright and extended position, ground-engaging wheel means swingably mounted upon the bottom member for optional disposition in compact folded position against the bottom member when the wall members are in nested relation and in outwardly swung ground-engaging position when the wall members are in extended position, said bottom wall being provided with an aperture, and link means extending through said aperture and being pivotally connected at its ends to the handle and to the wheel means for causing the latter to swing outwardly into ground-engaging position as the handle is swung into upright position.

References Cited in the file of this patent

UNITED STATES PATENTS

| 71,305 | Howarth | Nov. 26, 1867 |
| 504,445 | Dare | Sept. 5, 1893 |
| 724,255 | Brown | Mar. 31, 1903 |
| 2,519,146 | Marshall | Aug. 15, 1950 |